L. T. RHOADES.
MEANS FOR AUTOMATICALLY REGULATING AUTOMOBILE HEADLIGHTS.
APPLICATION FILED MAY 5, 1915.
1,241,284.
Patented Sept. 25, 1917.
2 SHEETS—SHEET 1.
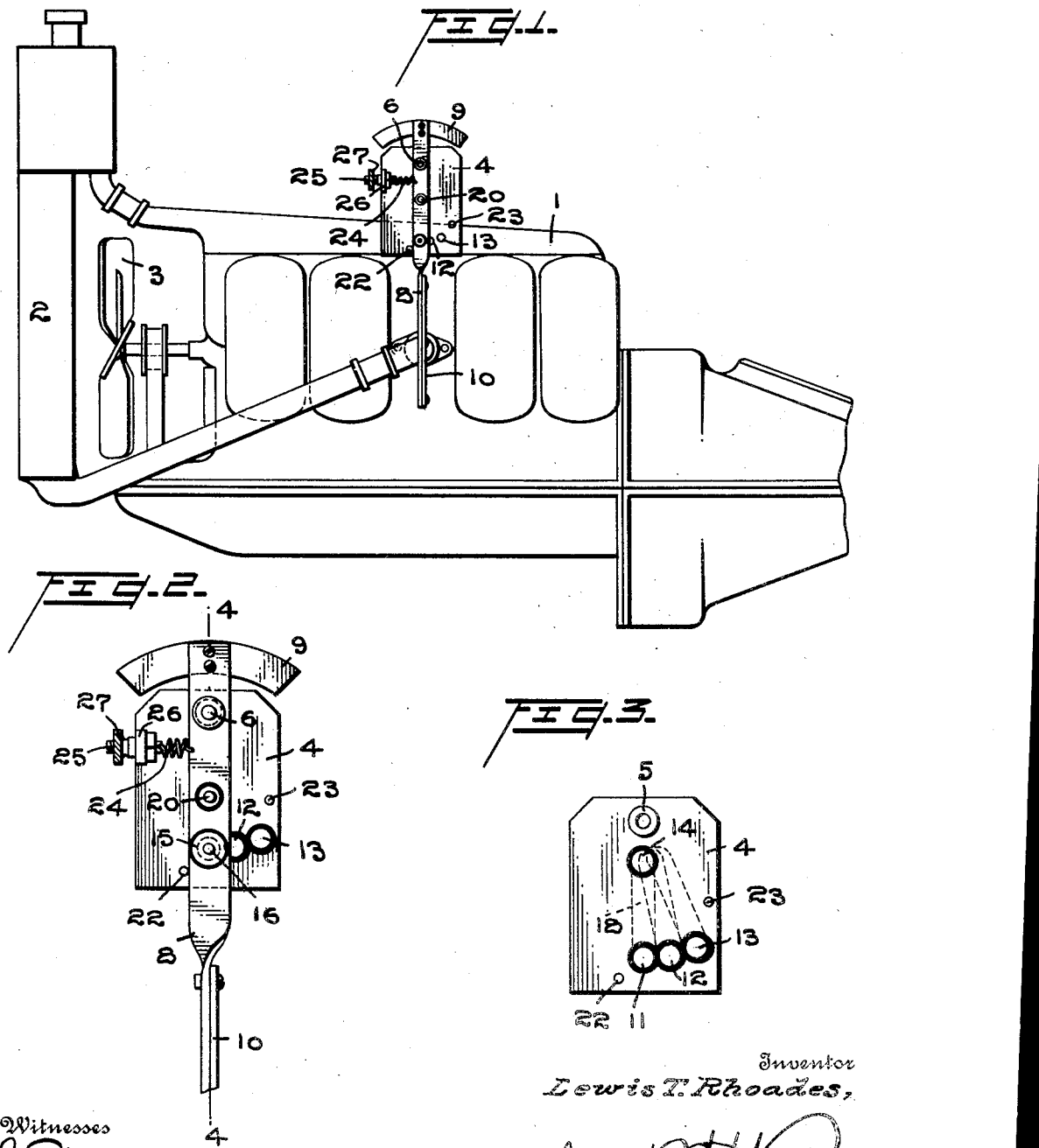

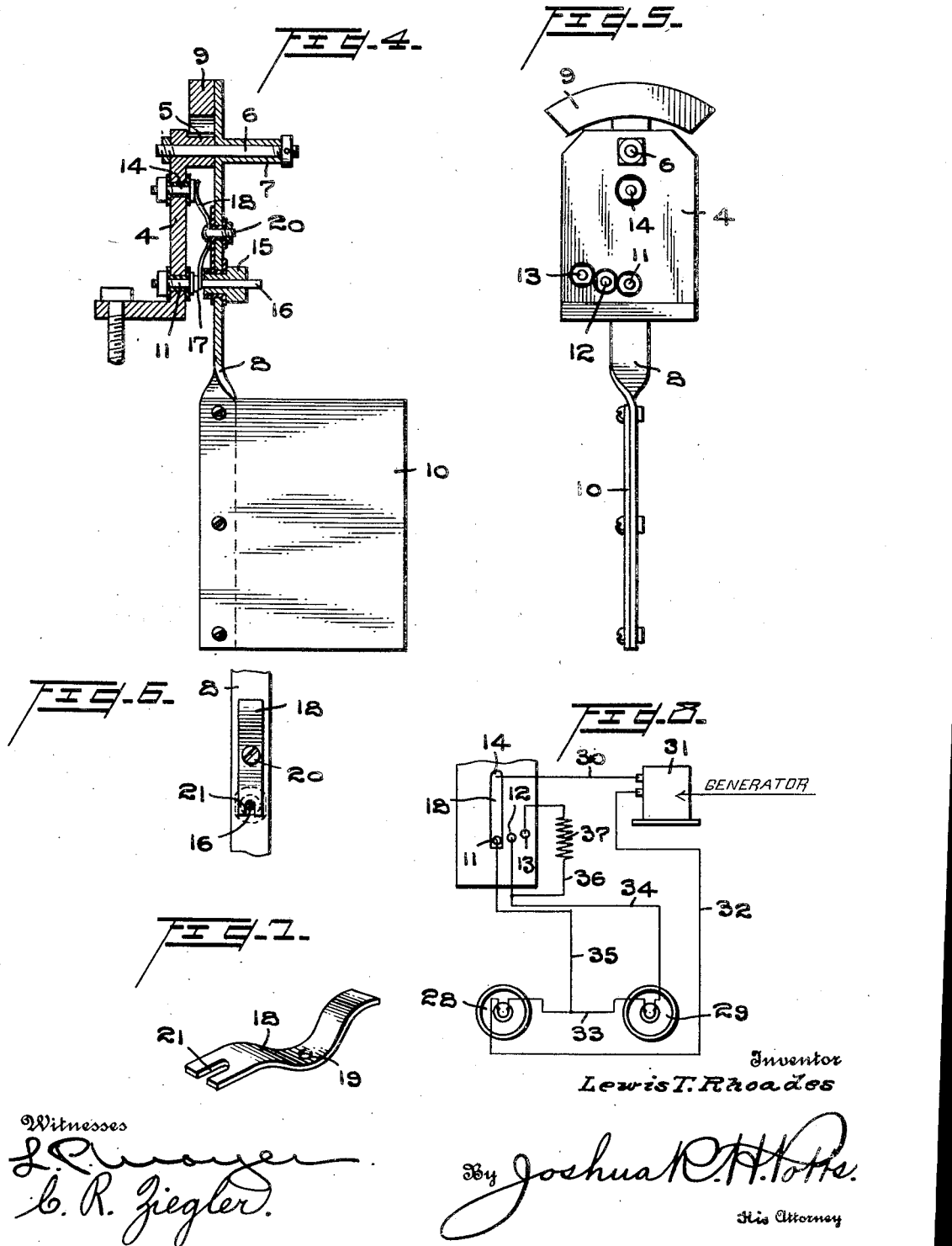

UNITED STATES PATENT OFFICE.

LEWIS T. RHOADES, OF MONT CLARE, PENNSYLVANIA, ASSIGNOR TO NEW YORK COIL COMPANY, INCORPORATED, OF NEW YORK, N. Y.

MEANS FOR AUTOMATICALLY REGULATING AUTOMOBILE-HEADLIGHTS.

1,241,284.     Specification of Letters Patent.    Patented Sept. 25, 1917.

Application filed May 5, 1915. Serial No. 26,088.

*To all whom it may concern:*

Be it known that I, LEWIS T. RHOADES, a citizen of the United States, residing at Mont Clare, in the county of Montgomery and State of Pennsylvania, have invented certain new and useful Improvements in Means for Automatically Regulating Automobile-Headlights, of which the following is a specification.

My invention relates to improvements in means for automatically regulating automobile head lights, the object of the invention being to provide an attachment which may be used in connection with various types of vehicles, and which is operated by the draft of air to control the position of a contact and regulate the supply of current to the head lights.

In a certain class of automobiles an alternating current generator is built in the fly wheel of the engine. This generator is used to supply current for both ignition and electric head lights. As the speed of the engine varies, the output of the generator likewise varies, as no means are employed to prevent such fluctuations in current. I find in use the greatest defect, however, is caused by the generator's failure to supply sufficient electrical output to light the two head lamps, which are connected in series of sufficient candle power to enable safe driving. At very high speeds the generator delivers so much current that the lamps are burned out in a very short time.

To overcome these difficulties, I have invented a novel device which automatically causes all of the current that is supplied for lighting purposes to be delivered to one lamp for the reason that at the slow speeds the generator does not have sufficient capacity to supply more than one lamp. When the speed of the generator reaches a point where its output is equal to supply two lamps, my invention automatically establishes the two lamps in the circuit, so that they both burn properly. At still greater speed, where the voltage would be sufficient to cause the lamps to burn out, my device automatically cuts in a coil of resistance in series with the two lamps effectively preventing their destruction.

For accomplishing this automatic regulation, I employ the draft of air created by the fan regularly supplied on this class of machines, which the builders have provided for keeping the cooling water at the proper temperature.

With these and other objects in view, the invention consists in certain novel features of construction and combinations and arrangements of parts as will be more fully hereinafter described and pointed out in the claims.

In the accompanying drawings:

Figure 1 is a view in side elevation illustrating my improved device in operative position on an engine.

Fig. 2 is a face view of the device on an enlarged scale.

Fig. 3 is a view in elevation of the supporting plate illustrating in dotted lines the positions of the contact spring.

Fig. 4 is a view in vertical longitudinal section on the line 4—4 of Fig. 2.

Fig. 5 is a view in elevation of the back face of the supporting plate and parts connected thereto.

Fig. 6 is a view in elevation of the rear face of the swinging arm showing the spring contact thereon.

Fig. 7 is a perspective view of the spring contact, and

Fig. 8 is an electric diagram illustrating my invention.

1 represents an engine of an ordinary type having a radiator 2 at one end and a fan 3 for creating a current of air to cool the engine as is well understood in this art.

4 represents a supporting plate which is vertically positioned as shown, and which is provided with a tubular stud 5 receiving a journal bolt 6 which projects through a bearing sleeve 7 on a swinging arm 8. The arm 8 is vertically positioned and hung from the journal bolt with the upper end of the arm extending above the bearing sleeve 7 and having a segmental weight 9 secured thereto to hold the arm steady. This weight 9 is designed to balance the arm and serves a very useful purpose especially when the car is ascending or descending grades as it overcomes the tendency of the arm to assume an abnormal position.

On the lower end of the arm 8, a blade or vane 10 is secured, and is located in the path of the air current forced by the fan 3, so that the air tends to swing the arm 8 on its pivot for a purpose which will hereinafter appear.

The plate 4 is provided near its lower end with three contacts 11, 12, and 13, said contacts insulated from the plate and constituting binding posts. A fourth contact 14 is located at the upper portion of the plate 4, is insulated from the plate, and also forms a binding post.

A tubular stud 15 is secured in and insulated from the arm 8, and supports a longitudinally movable contact pin 16 having a head 17 at its inner end adapted to engage respectively the contacts 11, 12, and 13.

18 represents a contact spring which is positioned longitudinally of the arm 8, and is provided with a central opening 19 to receive a bolt 20 securing the same to the arm 18, said spring being insulated from the arm. The spring is of general compound curvature, and at one end is always maintained in engagement with the contact 14. The other or lower end of the spring is bifurcated as shown at 21, and straddles the contact pin 16, exerting a constant pressure on the pin to insure a good contact.

As above stated, the spring 16 is in constant engagement with contact 14 which is due to the fact that the contact 14 is located close to the pivot point of arm 8, and the contact pin 16 swinging in the arc of a circle as the arm 8 moves, engages the contacts 11, 12, and 13 in succession.

The swinging movement of the arm 18 is limited in both directions by stops 22 and 23, and a coiled spring 24 connects the arm 8 with an adjusting screw 25 in a bracket 26 on plate 4, which spring normally holds the arm 8 in vertical position against stop 22 and returns the lever to such position when permitted.

An adjusting nut 27 is provided on the screw 25 to permit the tension of the spring to be varied as desired. 28 and 29 represent the head lights of an automobile, attention being called especially to the diagram in Fig. 8.

The contact 14 is connected by a wire 30 with one pole of the generator 31. The other pole of the generator 31 is connected by a wire 32 with one pole of the lamp 28. A wire 33 connects poles of the lamps 28 and 29, and a wire 34 connects the other pole of lamp 29 with contact 12.

A wire 35 connects wire 33 with contact 11. A wire 36 connects contact 13 with wire 34, and includes therein a resistance coil 37. In other words, the lamps are in series. When the car starts and is moving at slow speed, the spring contact 18 is in the position shown in Fig. 8, in which position the arm 8 is hanging in its normal vertical position. When in this position, the circuit is as follows:—from generator 31, through wire 30, contact 14, spring contact 18, contact 11, wire 35, head light 28, and wire 32, back to the generator, so that only head light 28 is lighted.

As the speed increases, and the draft of air is sufficient to move the arm 8, the latter will swing so that contact 16 will engage contact 12, in which position the circuit will be as follows:—from generator 31, through wire 30, contact 14, spring contact 18, contact 12, wire 34, through head light 29, wire 33, head light 28, and wire 32, back to the generator.

When the speed increases, so that the current reaches the danger point where it might burn out the lamps, arm 8 will swing to a position to move contact pin 16 against contact 13, when the circuit will be as follows:—from generator 31, through wire 30, contact 14, spring contact 18, contact 13, wire 36 including the resistance, thence through wire 34, and through the head lights and wires 33 and 32 as above explained.

As the speed of the car decreases, so that the draft of air decreases, the spring 24 will return the arm 8, so that the position of the arm is regulated entirely by the draft of air in connection with the spring for returning the arm, hence the device operates automatically so as to give the best results with the electric current had.

While I have illustrated my improvements in connection with a fan for inducing the current of air, it is of course to be understood that the draft of air may be induced in any ordinary way, such for example, as by the ordinary movement of the automobile, and I therefore do not limit myself to the particular means for creating the air draft.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a vehicle including an engine, a plurality of electric lamps, a generator for supplying electric current to the lamps and operated by said engine, a movable electric controller operative to cause the current to be supplied first to certain of said lamps and subsequently to be supplied simultaneously to all of said lamps, and means operated by the engine for producing a draft of air whereby the controller is operated, substantially as described.

2. In an automobile, the combination with a plurality of electric lamps, a generator, an electric controller operated by a draft of air to control the flow of current to the lamps, said controller normally connecting certain of said lamps with the generator and adapted when moved by said draft of air to include all of said lamps in circuit with the generator, and resistance adapted to be put in circuit with all of the lamps when the controller is moved to an extreme position, substantially as described.

3. In a vehicle having an engine for driving the vehicle, the combination with a plurality of electric lamps, a generator adapted to supply said lamps and having a speed controlled by and proportionate to the speed of the engine, a fan driven by said engine, and an electric controller operated by a draft of air from said fan to vary the resistance of the lamp circuit to minimize variations in current through the lamps produced by changes in generator speed, substantially as described.

4. The combination with a vehicle including an engine, a plurality of electric lamps, a generator for supplying electric current to the lamps and operated by said engine, a movable electric controller operative to cause the current to be supplied first to certain of said lamps and subsequently to be supplied simultaneously to all of said lamps, and means operated by the engine for producing a draft of air whereby the controller is moved, and resistance means adapted to be interposed between said generator and the lamps by the movement of said controller beyond a pre-determined position, substantially as described.

5. In an automobile, the combination with two head lights, a generator, an electric controller operated by a draft of air to control the flow of current to the head lights, said controller normally connecting one head light with the generator and adapted when moved by said draft of air to include both head lights in circuit with the generator, and resistance adapted to be put in the circuit to the head lights when the controller is moved to an extreme position, substantially as described.

6. The combination with an automobile, of head lights, a pivoted arm, a blade thereon designed to receive a draft of air to move the arm, a generator in electrical connection with said arm and head lights, and contacts placed to be engaged by said arm to regulate the current supply to the head lights, said contacts being in electrical connection with said head lights, substantially as described.

7. In combination a controller comprising a bracket, an insulated series of contacts thereon, a movable switch lever pivotally connected with the bracket and adapted to engage said contacts and having a broad vane-like portion whereby it may be shifted in one direction by air pressure; a generator; electric lights; and electrical connections between said contacts, the generator and lights, whereby the current may be regulated through the lights; with a fan adapted to produce air currents to act upon the vane-like portion of the switch lever and shift the switch according to the pressure of air developed by the fan.

8. In a controller for automobile head lights, the combination of a support, a series of contacts thereon, a movable vane-like switch lever pivotally connected with said support and adapted to engage said contacts, and having a broad vane-like portion whereby it may be shifted in one direction by air pressure, a generator operated by the motor shaft; electric lights; and electrical connections between said contacts, the generator and the lights whereby the current may be regulated through the lights; with a fan operable from the motor shaft and adapted to produce air currents to act upon the vane-like portion of the switch lever and shift the switch according to the pressure of air developed by the fan, and a spring for returning the switch lever to normal position.

In testimony whereof I have signed my name to this specification in the presence of two subscribing witnesses.

LEWIS T. RHOADES.

Witnesses:
C. R. ZIEGLER,
S. W. FOSTER.